United States Patent Office 3,542,798
Patented Nov. 24, 1970

3,542,798
PYRIDYL-2-IMIDAZOLONE DERIVATIVES
Karl J. Doebel, Ossining, and Norbert Gruenfeld, Bronx, N.Y., assignors to Geigy Chemical Corporation, Ardsley, N.Y., a corporation of New York
No Drawing. Filed Dec. 30, 1968, Ser. No. 788,007
Int. Cl. C07d 31/36
U.S. Cl. 260—295      7 Claims

ABSTRACT OF THE DISCLOSURE 1-(pyridyl)-2-imidazolones which may be substituted in 4- and/or 5-position are analgesic, anti-inflammatory, and antipyretic agents. An illustrative embodiment is 1-(3-pyridyl)-4,5-dimethyl-2-imidazolone.

---

The present invention pertains to compounds of the formula

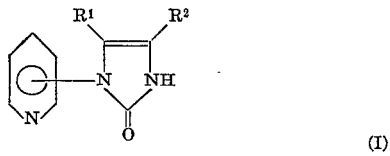

(I)

wherein each of $R^1$ and $R^2$ independently is hydrogen or lower alkyl.

Furthermore, the present invention relates to novel methods and compositions comprising a compound of Formula I for effecting analgesic, anti-inflammatory, and antipyretic response in warm-blooded animals, especially mammals.

The term "lower alkyl" means a straight or branched hydrocarbon chain of the formula $C_nH_{2n+1}$ wherein $n$ represents an integer of from 1 to 3. Illustrative of such alkyl groups are methyl, ethyl, propyl and isopropyl, preferred methyl.

The 1-(pyridyl)-2-imidazolones of Formula I can be prepared by cyclizing a urea of the formula:

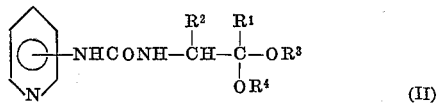

(II)

wherein $R^1$ and $R^2$ are as defined above and each of $R^3$ and $R^4$ is lower alkyl or together are alkylene, with an aqueous or alcoholic mineral acid such as sulfuric, hydrochloric, phosphoric acid or the like, or a strong organic acid such as acetic, formic, methanesulfuric acid or the like. The reaction is preferably executed in the presence of an inert organic solvent such as ethanol, methanol, dioxane or the like. While the reaction can be performed at normal room temperatures; e.g., about 25° C., the use of elevated temperatures contributes measurably to a reduction in reaction time. The product generally forms directly and can be isolated via standard techniques such as filtration. Additional purification can be effected through conventional methods such as crystallization, chromatography, sublimation or the like.

The ureas of Formula II can be readily obtained through condensation of an amine and isocyanate, either an aminopyridine with a α-isocyanate of the appropriate acetal or ketal or a pyridine isocyanate with a α-amino acetal or ketal. This condensation is readily accomplished through simple admixture of the two reagents, optionally in an inert solvent such as benzene, under nonaqueous conditions. Mild heating; e.g., refluxing, after the initial reaction period, generally improves yields. Upon completion of this condensation and removal of any solvent, as through evaporation, the resulting urea can be isolated for cyclization or cyclized directly as described above.

The acetals and ketals of the aminoaldehydes and aminoketones may be dialkyl acetals or ketals; e.g., the diethyl acetal or diethyl ketal, or may be cyclic such as the ethylene acetal or ethylene ketal.

The compounds of the present invention demonstrate the properties of inhibiting and reducing inflammation, relieving pain and reducing fever in warm-blooded animals when administered orally or parenterally. They are thus useful as anti-inflammatory and analgesic agents. The anti-inflammatory property of this class of compounds can be conveniently observed in the laboratory model in such art recognized tests as the turbidity model, anti-carriageenin test, and ultraviolet erythema anatagonism.

In the turbidity model test, inhibition of heat coagulation of serum proteins is observed in rats at an oral dose of 100 mg./kg. In the ultraviolet erythema anatagonism test, the tested compounds show protection at oral doses as low as 100 mg./kg. In the anticarrageenin test, a reduction of swelling is observed at an oral dose of 100 mg./kg. In the acetic acid stretch test, a decrease in number of stretches is observed in mice at a subcutaneous dose of (60 mg./kg.) and an oral dose of 100 mg./kg.

The compounds of Formula I are administered for the purpose of treating inflammatory conditions, which are commonly treated with known anti-inflammatory agents, such as arthritis, rheumatism, and related diseases of an inflammatory nature. They are particularly suited for inflammatory conditions accompanied by pain, as well as being suitable for the relief of pain per se.

The following description of using and making the invention represents the best modes presently contemplated for carrying out the invention. When used as anti-inflammatory and analgesic agents, the compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required solid or liquid pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like is wetted with a binder such as acacia mucilage, gelatin solution, methyl-cellulose solution and forced through a screen to form granules which are allowed to dry. A suspending agent such as tragacantho may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, sterile aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration.

The amount of these compounds which is administered in use to effect an ant-inflammatory and analgesic response must in all cases be adjusted to the animal being treated, its age, weight, and condition as well as the degree of response required. Thus while anti-inflammatory and analgesic response is observed for these compounds in the range of about 50 mg./kg. to about 300 mg./kg. p.o., the actual dose should be carefully titrated to the particular subject in accordance with well recognized principles of pharmacology.

The following examples are given by way of illustrating the process for the preparation of the compounds and the compositions without limiting the scope thereof in any way. The temperatures are given in degrees centigrade.

EXAMPLE 1

1-(3-pyridyl)-5-methyl-2-imidazolone (a) To a solution of 9.4 g. 2-aminopyridine in 30 ml. of water are added dropwise 9 ml. 37% formaldehyde. Stirring is continued for 30 minutes and an aqueous solution of 15.9 g. of ethyl isonitrosoacetoacetate is then added. The mixture is refluxed for 4 hours and after cooling, the precipitated material is collected by filtration and repeatedly recrystallized from a mixture of methanol and water to yield 1-(3-pyridyl)-4-carboethoxy-5-methyl-2-imidazolone, M.P. 198–9°.

*Analysis.*—Calc'd for $C_{12}H_{13}N_3O_3$ (percent): C, 58.4; H, 5.32; N, 170.2. Found (percent): C, 58.3; H, 5.4; N, 16.94.

(b) A solution of 1-(3-pyridyl)-4-carboethoxy-5-methyl-2-imidazolone (14.5 g.) in 150 ml. of 3 N sodium hydroxide is heated under reflux for 4 hours. The resulting solution is adjusted to pH 7 with 3 N hydrochloric acid and evaporated to dryness. The residue is extracted with ethanol in a Soxhlet apparatus and the ethanolic solution is evaporated to dryness to yield 1-(3-pyridyl)-5-methyl-2-imidazolone-4-carboxylic acid.

(c) A solution of 1-(3-pyridyl)-5-methyl-2-imidazolone-4-carboxylic acid in ethylene glycol is heated at 220° for 3 hours and evaporated to dryness under reduced pressure. Sodium carbonate solution is added and the mixture is repeatedly extracted with chloroform. The chloroform extracts are dried over sodium sulfate and evaporated to dryness. The residue is recrystallized from ethanol to yield the title compound, M.P. 196–198°.

*Analysis.*—Calc'd for $C_9H_9N_3O$ (percent): C, 61.8; H, 5.18; N, 24.0. Found (percent): C, 61.1; H, 5.21; N, 23.1.

EXAMPLE 2

1-(3-pyridyl)-4,5-dimethyl-2-imidazolone

A solution of α-amino-butanone ethylene ketal (14.15 g., .108 mole) in dry benzene (25 ml.) is added dropwise to a cold, dry solution of 3-pyridine isocyanate (prepared from .108 mole of nicotinoyl azide) in benzene. The resulting solution is stirred for ½ hour at room temperature filtered if necessary, and the solvent stripped to yield a maroon colored gelatinous product comprising N-(3-pyridyl)-N'[2 - (3,3 - ethylenedioxybutyl)] urea which need not be purified.

This material (32.63 g., .130 mole) is dissolved in methanol (870 ml.) and cooled while 1 N sulfuric acid (345 ml.) is added. The resulting solution is heated at 80° for three hours. The pH is adjusted to 7 with saturated sodium carbonate solution and the methanol is removed under vacuo below 40°. The pH is adjusted to 9 and the product is extracted into dichloromethane (5×250 ml). The organic layer is washed, dried over sodium sulfate and evaporated to dryness under vacuo below 40° to yield the product (M.P. 174–177°), which is slurried with anhydrous benzene and recrystallized twice from benzene to yield the same desired compound, M.P. 183–186°.

*Analysis.*—Calc'd for $C_{10}H_{11}N_3O$ (percent): C, 63.48; H, 5.86; N, 22.20. Found (percent): C, 63.22; H, 5.95; N, 22.41.

EXAMPLE 3

1-(3-pyridyl)-2-imidazolone

A solution of aminoacetaldehyde diethylacetal (6.60 g., .0495 mole) in dry benzene (15 ml.) is added dropwise to a cold solution of 3-pyridyl isocyanate (7.36 g., .0495 mole) in dry benzene (340 ml.) over a 10-minute period. A solid begins to form almost immediately and the suspension is stirred at room temperature for 3 hours. The suspension is cooled and filtered to yield $N_1$-(3-pyridyl)-$N_3$-(2,2-diethoxyethyl)urea, M.P. 97–102°, which is washed with benzene.

A suspension of $N_1$-(3-pyridyl)-$N_3$-(3,3-diethoxyethyl) urea (26.63 g., 105 mole) in cold water (650 ml.) is cooled while 1 N sulfuric acid (262 ml.) is added. The resulting solution is heated under a nitrogen atmosphere at reflux temperatures for three hours. The mixture is cooled, adjusted to pH 9 with saturated sodium carbonate solution and, after saturating the solution with sodium chloride, extracted into chloroform (9×300 ml.). The organic layer is washed, dried, and evaporated to dryness to yield 1-(3-pyridyl)-2-imidazolone M.P. 165–174°. This product is slurried in either (100 ml.) and recrystallized from 2 B ethanol (75 ml.) to yield the desired compound, M.P. 175–178°.

*Analysis.*—Calc'd for $C_8H_7N_3O$ (percent): C, 59.62; H, 4.38; N, 26.07. Found (percent): C, 59.38; H, 4.30; N, 26.01.

EXAMPLE 4

1-(3-pyridyl)-4-methyl-2-imidazolone

α-Aminopropionaldehyde diethylacetal is prepared from α-bromopropionaldehyde diethylacetal as described by R. Burtles et al., J. Chem. Soc., 1925, 581.

A solution of 3-pyridyl isocyanate (8.74 g., .0729 mole) in dry benzene (190 ml.) is cooled under nitrogen atmosphere while a solution of α-aminopropionaldehyde diethylacetal (10.50 g., .0729 mole) in dry benzene (25 ml. is added in a dropwise fashion. The resulting solution is stirred at room temperature for 1½ hours and the benzene solution is evaporated to dryness to yield $N_1$-(3-pyridyl)-$N_3$-[2-(1,1-diethoxypropyl)]urea as a yellow oil. A suspension of the urea (18.00 g., .0675 mole) in water (188 ml.) is cooled while 1 N sulfuric acid (151 ml.) is added. The resulting solution is heated at reflux under a nitrogen atmosphere for three hours. The solution is cooled, adjusted to pH 9 with saturated sodium carbonate solution, and the solid which forms is collected, M.P. 197–200°

(dec.). The filtrate is extracted into dichloromethane (6×125 ml). The organic layer is washed, dried over sodium sulfate and evaporated to dryness to yield additional product. The combined material is slurried twice in ether (75 ml.) for 15 minutes and recrystallized from 2 B ethanol (50 ml.) to yield the desired compound, M.P. 198–202° (dec.).

*Analysis.*—Calc'd for $C_9H_9N_3O$ (percent): C, 61.70; H, 518; N, 23.99. Found (percent): C, 61.52; H, 5.08; N, 23.75.

EXAMPLE 5

1-(2-pyridyl)-2-imidazolone

A solution of phosgene (12.5%) in benzene (.20 mole, 157.5 g., 160 ml.) is cooled to −10 to −5°, while a solution of triethylamine (.25 m., 25.00 g.) in dry ether (150 ml.) is added dropwise over a ½-hour period. The resulting suspension is cooled to −10 to −5° while a solution of aminoacetaldehyde diethylacetal (.175 mole, 23.00 g.) in dry ether (150 ml.) is added dropwise over one hour. The suspension is stirred in the cold for 1½ hours. Additional triethylamine (.25 mole, 25.00 g.) is added and the salts are then removed through filtration. The filtrate is evaporated to an oil which is distilled to yield 2,2-diethoxyethylisocyanate, B.P. 66–71°/10 mm., $n_D^{25}$ 1.5658.

A suspension of 2-aminopyridine (6.85 g., of .0730 mole) in dry benzene (70 ml.) is cooled while a solution of 2,2-diethoxyethyl isocyanate (7.55 g., .0475 mole) is added over a 15-minute period. The resulting solution is stirred overnight under an anhydrous nitrogen atmosphere. The solvents are then removed to yield 1-(2-pyridyl)-3-(2,2-diethoxyethyl)urea, M.P. 84–920, which is cyclized without further purification.

1-(2-pyridyl)-3-(2,2-diethoxyethyl)urea (16.60 g., 0.656 mole) is suspended in water (475 ml.) and cooled while 1 N sulfuric acid (203 ml.) is added. The resulting solution is heated at reflux temperatures under a nitrogen atmosphere for three hours. The solution is cooled, adjusted to pH 9 with saturated sodium carbonate solution (180 ml.), and extracted with chloroform (4×150 ml.). These extracts are washed, dried over sodium sulfate and stripped to yield 1-(2-pyridyl)-2-imidazolone which is suspended in benzene and recrystallized from methanol, M.P. 183–186°.

*Anaylsis.*—Calc'd for $C_8H_7N_3O$ (percent): C, 59.62; H, 4.38; N, 26.07. Found (percent): 59.55; H, 4.43; N, 26.26.

EXAMPLE 6

1-(2-pyridyl)-4,5-dimethyl-2-imidazolone

An anhydrous solution of 0.04 mole of phosgene in benzene (12.5%, 31.40 g. or 32 ml.) is cooled to −10° to −5° while a solution of triethylamine (.05 mole, 6.8 ml.) in dry ether (20 ml.) is added in a dropwise fashion over 5 minutes. The resulting suspension is cooled to −10° to −5° while a solution of α-aminobutanone ethylene ketal (4.58 g., .035 mole) in dry ether (20 ml.) is added. The suspension is stirred at −10° to −5° for ½ hour, at which time a further portion of triethylamine (.05 mole, 6.8 ml.) is added. The salts are removed by filtration and the filtrate is evaporated to dryness to yield 2,2-ethylenedioxybutyl-3-isocyanate which may be used without further purification.

A solution of 2-aminopyridine (3.78 g., .0405 mole) in dry benzeune (100 ml.) is cooled while a solution of 2,2-ethylenedioxybutyl-3-isocyanate (6.46 g., .0405 mole) in dry benzene (30 ml.) is added. The resulting solution is stirred at room temperature for 3 days. The solvent is removed and the residue is slurried in ether (75 ml.) at room temperature to yield $N_1$-(2-pyridyl)-$N_3$-[2-(3,3-ethylenedioxybutyl)]urea, M.P. 136–140° (dec.).

A suspension of $N_1$-(2-pyridyl)-$N_3$-(2,2-ethylenedioxybutyl)urea (894 g., .0355 mole) in water (202 ml.) is cooled while 1 N sulfuric acid (89.3 ml.) is added. The resulting solution is heated at reflux under a nitrogen atmosphere for 3 hours, then cooled and adjusted to pH 9 with saturated sodium carbonate solution. The solid which forms is collected, washed and dried. A second crop of crystals can be obtained by extracting the aqueous solution with chloroform (3×100 ml.). The combined material is slurried in ether (135 ml.) and recrystallized from 2 B ethanol to yield the desired compound, M.P. 192–195° (dec.).

*Analysis.*—Calc'd for $C_{10}H_{11}N_3O$ (percent): C, 63.48; H, 5.86; N, 22.20. Found (percent): C, 63.27; H, 6.08; N, 21.95.

EXAMPLE 7

1-(4-pyridyl)-4,5-dimethyl-2-imidazolone

A solution of 2,2-ethylenedioxybutyl-3-isocyanate (18.5 g., .119 mole) in dry benzene (75 ml.) is added to a cold suspension of 4-aminopyridine (10.8 g., .115 mole) in dry benzene (75 ml.). The resulting suspension is stirred at room temperature for three days. The solvent is evaporated and the residue is dissolved in chloroform. Any chloroform-insoluble material is removed and discarded. The solution is clarified with charcoal and evaporated to dryness to yield $N_1$-(4-pyridyl)-$N_3$-[2-(3,3-ethylenedioxybutyl)]urea.

The $N_1$ - (4 - pyridyl) - $N_3$-[2-(3,3-ethylenedioxybutyl)]urea (28.62 g., .114 mole) is dissolved in water (1460 ml.) and sulfuric acid (1N, 470 ml.) is added with cooling. The resulting solution is stirred at room temperature for one hour, heated at reflux for 3 hours under a nitrogen atmosphere, cooled, adjusted to pH 9 with saturated sodium carbonate solution and extracted with cholorform (8×350 ml. plus 7×150 ml.). The combined extracts are washed, dried, and evaporated to dryness. The residue first slurried and then recrystallized from ethyl acetate to yield the desired compound, M.P. 188–190°.

*Analysis.*—Calc'd. for $C_{10}H_{11}N_2O$ (percent): C, 63.47; H, 5.86; N, 22.21. Found (percent): 63.63; H, 5.77; N, 22.28.

EXAMPLE 8

| Ingredient: | Quality/capsule, mg. |
|---|---|
| 1-(3-pyridyl)-4-methyl-2-imidazolone | 75 |
| Corn starch, U.S.P. | 200 |

The foregoing ingredients are mixed and introduced into a two-piece No. 1 hard gelatin capsule.

EXAMPLE 9

| Ingredient: | Quantity/capsule, mg. |
|---|---|
| 1-(3-pyridyl)-5-methyl-2-imidazolone | 50 |
| Corn starch, U.S.P. | 130 |
| Lactose | 160 |
| Cab-O-Sil M–5 | 4 |
| Gelatin, U.S.P. | 5 |
| Magnesium stearate, U.S.P. | 1 |

The foregoing ingredients are thoroughly mixed and pressed into tablets suitable for oral administration of 50 g. of active ingredient. The tablets may be scored to permit administration of fractional doses.

EXAMPLE 10

| Ingredient: | Quantity/tablet, mg. |
|---|---|
| 1-(2-pyridyl)-4,5-dimethyl-2-imidazolone | 100 |
| Lactose | 80 |
| Corn starch | 70 |
| Soluble starch | 15 |
| Magnesium stearate | 5 |

The first three ingredients are thoroughly mixed and granulated with a solution of the soluble starch. This granulate is dried, mixed with the magnesium stearate and pressed into tablet cores which are coated as with sugar.

What is claimed is:
1. A compound of the formula

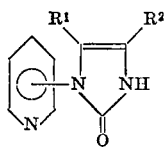

wherein each of $R^1$ and $R^2$ independently is hydrogen or lower alkyl.

2. The 3-pyridyl compound according to claim 1 wherein $R^1$ is methyl, $R^2$ is hydrogen.

3. The 3-pyridyl compound according to claim 1 wherein $R^1$ and $R^2$ are each methyl.

4. The 3-pyridyl compound according to claim 1 wherein $R^1$ and $R^2$ are each hydrogen.

5. The 3-pyridyl compound according to claim 1 wherein $R^1$ is hydrogen and $R^2$ is methyl.

6. The 2-pyridyl compound according to claim 1 wherein $R^1$ and $R^2$ are each methyl.

7. A 4-pyridyl compound as defined in claim 1 wherein $R^1$ and $R^2$ are each methyl.

References Cited

UNITED STATES PATENTS 3,236,853   2/1966   Schmitt et al. ___ 260—295 XR

ALAN L. ROTMAN, Primary Examiner

U.S. Cl. X.R.

260—295.5, 340.6; 424—266